Oct. 31, 1967

N. B. KNOEPFLER ET AL 3,350,486

METHOD OF PRODUCING CONTOUR MOLDED COTTON BATTING

Filed April 29, 1965

INVENTORS
NESTOR B. KNOEPFLER ET AL

BY

ATTORNEYS

Oct. 31, 1967    N. B. KNOEPFLER ET AL    3,350,486
METHOD OF PRODUCING CONTOUR MOLDED COTTON BATTING
Filed April 29, 1965
4 Sheets-Sheet 2

INVENTORS
NESTOR B. KNOEPFLER ET AL
BY
ATTORNEYS

INVENTORS
NESTOR B. KNOEPFLER ET AL

BY

ATTORNEYS

Oct. 31, 1967   N. B. KNOEPFLER ET AL   3,350,486
METHOD OF PRODUCING CONTOUR MOLDED COTTON BATTING
Filed April 29, 1965
4 Sheets-Sheet 4

INVENTORS
NESTOR B. KNOEPFLER ET AL
BY
ATTORNEYS

United States Patent Office

3,350,486
Patented Oct. 31, 1967

3,350,486
METHOD OF PRODUCING CONTOUR MOLDED COTTON BATTING
Nestor B. Knoepfler, New Orleans, and Homer K. Gardner, Jr., and Henry L. E. Vix, Metairie, La., assignors to the United States of America as represented by the Secretary of Agriculture
Filed Apr. 29, 1965, Ser. No. 452,032
11 Claims. (Cl. 264—112)

A non-exclusive, irrevocable, royalty-free license in the invention herein described, throughout the world for all purposes of the United States Government, with the power to grant sublicenses for such purposes, is hereby granted to the Government of the United States of America.

This is a continuation-in-part of Ser. No. 271,525, which was filed Apr. 8, 1963 and which has now matured into Patent No. 3,181,225, granted May 4, 1965. The invention described therein is here supplemented by unexpected and significant data which was obtained in the continuation of our investigations. We now have discovered contoured and/or compacted batts can be prepared by slight modification of the process disclosed in said Patent No. 3,181,225.

We have unexpectedly found that by modifying the process of said Patent No. 3,181,225, we can (1) produce a batt which has a permanently-contoured shape, (2) produce a batt which has preselected and desired varying degrees of compaction, either in the same or in separate batts, and (3) produce a batt which has the combined desirable qualities of permanently-contoured shape and permanently-compacted homologous or varying configuration.

To obtain the most desirable batts with contoured configuration and/or varying degrees of compaction, we can submit the cellulosic batting material to the resinous spray treatment of said Patent No. 3,181,225; and when the spray damp wet add-on is about from 50% to 150%, we place the spray damp material in a confining mold which has the desired curved configuration and/or varying compactness, and cure the material while holding it in the suitable configuration. This in general is the process of our new invention. The finished batts by process of this invention can have the same dimensional stability described in said Patent No. 3,181,225, the coherence, and the resiliency, etc. However, while the material produced by process of said Patent No. 3,181,225 is generally of a homogenous and regular flat configuration, the material produced by the process of this continuation-in-part can have a curved configuration, a varying degree of compactness, or a combination of these. For producing the contoured or the variably compacted batts by processes of this invention, it is essential that the degree of dampness amounts to at least 50% by weight based on the weight of the unsprayed web.

We have found that a spray dampness under 50% will yield a batt with poor resilience and poor shape-retention. The material will not hold the predetermined configuration or degree of compaction. A spray dampness above 150% will yield a batt with a skinning effect, and will be overly stiff and may be brittle. The hand of this material will be undesirable and rough. The undesirable qualities are generally attributable to resin migration during drying. The preferred 100% spray dampness to be in the "preferred" category must be from a 20% solids bath.

This invention relates to a process for improving fibrous cotton batt as its dimensional stability, resilience, and compaction are improved. The process consists basically of the application of chemical substances to the opened and garnetted fibers of cotton, which can consist of a blend of various grades of cotton lint and linters to produce a superior batt with excellent variable properties.

This invention is a product of investigative effort to combat the increasing competition to cotton material by the recent advances of the natural and synthetic foamed products, which are dimensionally stable, and which have significantly better coherence and resiliency than batting made from untreated cotton fibers or other such cellulosic materials.

The main object of this invention is to provide a process of the manufacture of fibrous batt with dimensional stability and improved resiliency under varying conditions of humidity and use. The utility of the improved batting lies in the fact that the more economical material which the batting industry has been providing in the past can regain its markets lost to the synthetics and others by simple chemical processing of the low-grade cotton materials. These have for years been employed in the furniture and automotive industries for such articles as mattresses, upholstering of many furniture pieces, automotive cushioning, etc.

Another object of this invention is to provide a process for making fibrous batt with improved resistance to compaction, and having better coherence than normal commercial batting.

A further object of this invention is to facilitate the production of an improved batt, which will retain its dimensions, and will resist compaction or settling in specific applications such as insulation.

The application of the chemical substances is done through a single or a plurality of nozzles, which wet the web as it moves past the fine spray. The spray must be controlled as to avoid extremes in wetting the web. The application of a fine mist or a fog would dissipate the chemicals to the air or cause the chemicals to permeate through the fibrous structure without adhering to any surface, thereby wasting the chemicals, while a heavy spray would cause overwetting in that large droplets would lodge irregularly or nonuniformly throughout the structure of the web.

The economic feasibility of the products of our invention depend to a considerable extent upon the method of application of the chemicals. The chemicals employed here are formulations in which a crosslinking or reactive type resin can be used either alone or in combination with a film-forming latex. Performance depends on the proper selection of resin and latex, and the uniform distribution of the resinous substances within the physical structure of the web. The deposition of chemicals may occur on the surface, as a physical occlusion which bonds the fibers of the loose structure, or as a chemical reaction which might take place either on the surface or within the cellulosic molecular structure of the cotton fiber. A crosslinking reaction gives the cellulosic molecule a certain amount of rigidity, which in turn causes physical, as well as chemical, rigidity or resiliency—as desired—to the cotton batt.

The resins used in this process are selected for their inherent properties, which include the capability of reacting chemically with the cellulose of the cotton. These resins by virtue of the reaction with the cellulose molecules, by crosslinking or other phenomenon, enhance the resilience of the fibers, or improve their resistance to permanent deformation resulting from flexing or bending.

The function of the latex, which in effect is a film forming resin, or coating, is to assure interfiber binding at points of contact between fibers. The latex then contributes to dimensional stability, coherence, and textile tensile and tear strength of the finished batt.

The application of a latex to the web yields a batt with improved tearing strength, dimensional stability, and resistance to compaction through physical shifting of fibers within the structure under varying conditions of humidity. The application of both crosslinking resin and latex to the web will yield a batt with these charactersics plus improved resiliency.

An important feature of this invention is the means employed for the application of the chemical substances to the webs, or layers of fibers, so that a great degree of uniformity of treatment can be obtained while the operation is of a continuous economic character.

The advantages and objectives become more apparent upon a consideration of the accompanying schematic drawing in which FIGURE 1A depicts an embodiment of a conventional apparatus for carrying out the inventive processing sequence for the production of batting, including the conventional method of crosslapping and the application of an appropriate resin alone or combined with a latex by spraying;

Figure 4A:
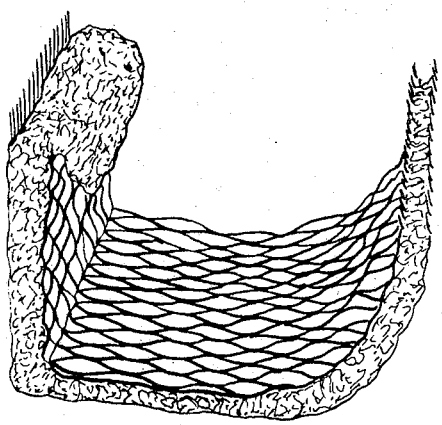
Figure 4B:
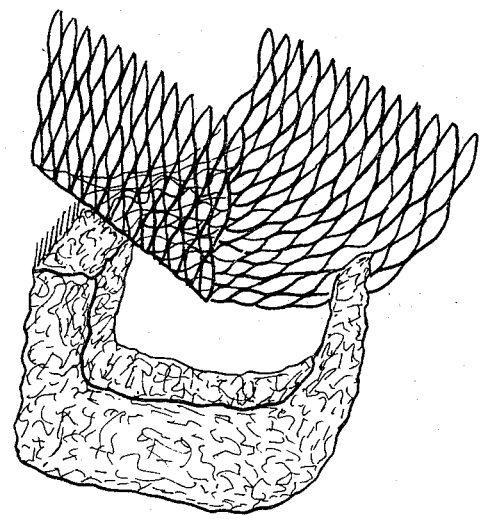
Figure 4C:
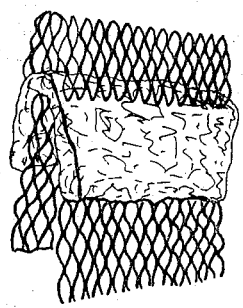
Figure 5A:
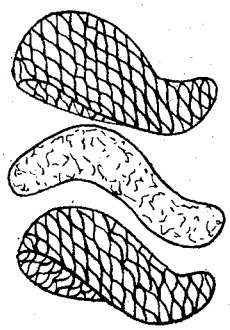
Figure 5B:
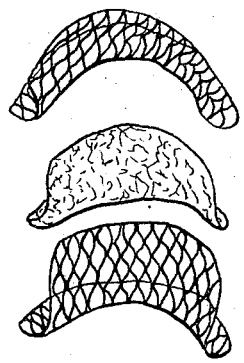
Figure 5C:
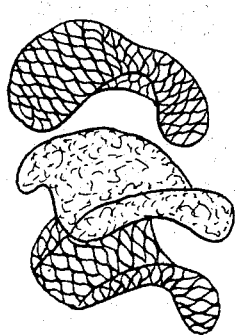
Figure 6:
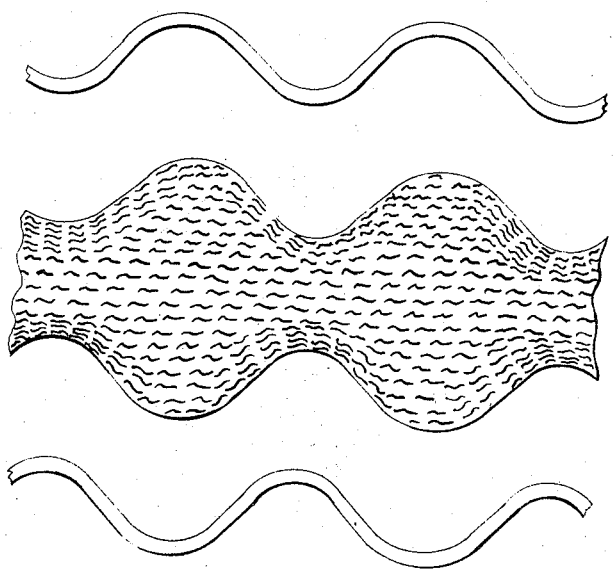

FIGURES 4A, 4B, and 4C are views depicting the use of expanded metal for mold parts to produce a batt simulating the contour of the arm of an upholstered sofa;

FIGURES 5A, 5B, and 5C are views depicting the use of expanded metal for mold parts to produce a batt simulating the contour of an automobile bucket seat; and FIGURE 6 is a view illustrating that in the molded product the greatest density occurs at the thinnest portions of the batt.

Figure 1A:
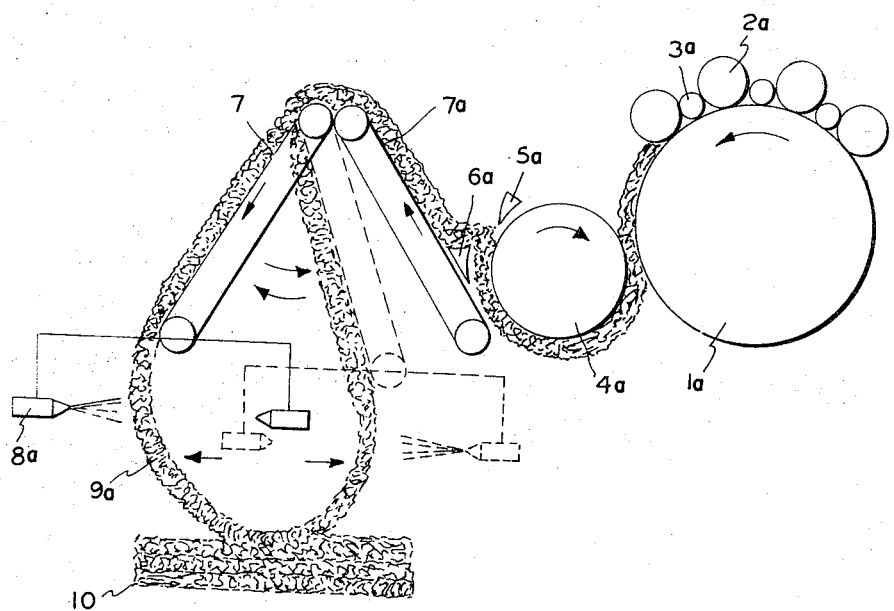
FIGURE 1B depicts another embodiment of apparatus similar to that of FIGURE 1A, differing therefrom in the main in that it illustrates the conventional reel-type batt former.
Figure 1B:
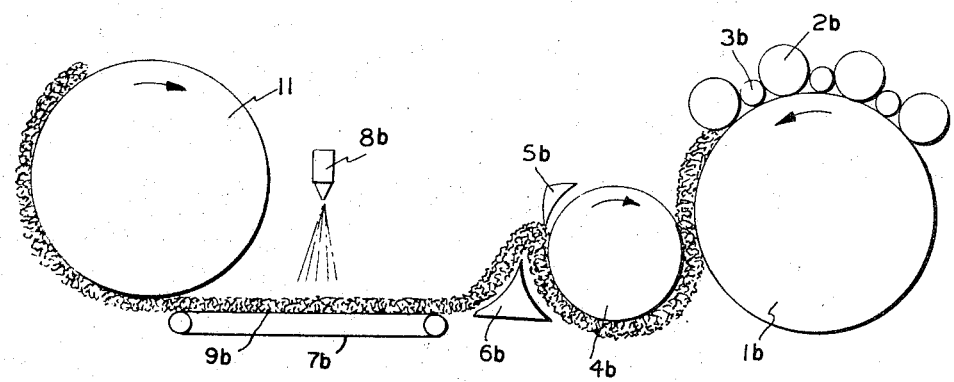

Referring to FIGURE 1A, blended cotton fibers consisting of textile wastes and linters in various proportions are fed to the main cylinder 1a of the carding section of a conventional garnett, worked by worker rolls 2a, stripped from the worker rolls and returned to the main cylinder by stripper rolls 3a, removed from the main cylinder by conventional doffer roll 4a, combed from the doffer roll by comb 5a which works against the doffer roll 4a and baffle 6a, and transported in web form on traveling aprons 7 and 7a for lap-forming operations. In FIGURE 1B, the apparatus depicted operates in much the same manner as that of FIGURE 1A, with the parts thereof corresponding to those of FIGURE 1A being respectively illustrated by main cylinder 1b, worker rolls 2b, stripper rolls 3b, doffer roll 4b, comb 5b, baffle 6b, and apron 7b. This embodiment differs in the main from that of FIGURE 1A in that the web form is transported to reel 11 for lap-forming operations. The foregoing description relating to FIGURES 1A and 1B constitutes conventional commercial practice and as such is incidental to and forms no part of the instant invention.

Following removal of the web of carded cotton fibers from the main cylinder, the web is sprayed by means of spray device 8a in FIGURE 1A or 8b in FIGURE 1B, and the sprayed web 9a in FIGURE 1A or 9b in FIGURE 1B, now wetted with the several component reagent according to the instant invention, is lapped to produce partially-formed batt 10 as shown in FIGURE 1A or collected on reel 11 as shown in FIGURE 1B.

Figure 2:
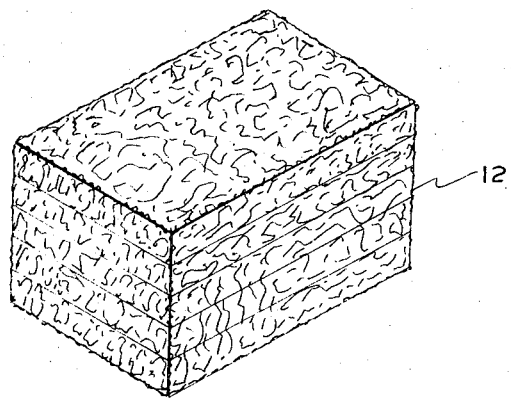
FIGURE 2 shows a sectional view of a batt prepared by adherence to the process of this invention.

The sprayed and layered webs are then condensed into batts through rolls or other suitable pressure means, not shown, to assure good contact between the successive layers 12 (FIGURE 2) of webs.

In FIGURES 1A and 1B, the feed material consists of a blend of 60% of first-cut linters, and 40% of various grades of textile wastes. This mixture is an example, and in no way critical to the process. The blend is passed through suitable commercially-available processing units to be formed into a web or layer of fibers, which are discharged onto a moving belt or conveyor. At this point, the fibers are in an extremely open configuration, which makes possible the application of the resins and/or resinous or other type latex by a spray system, using a single or a multiplicity of spray heads or nozzles in such a way as to achieve a uniform distribution of the chemicals on the web. The wet add-on of the solutions can be controlled to between 20 and 150% of the weight of the fiber feed by controlling the flow of solutions to the spray heads.

In specific examples of this invention, the optimum wet add-on varied from 70 to 120%, depending on the properties desired in the finished products.

Figure 3:
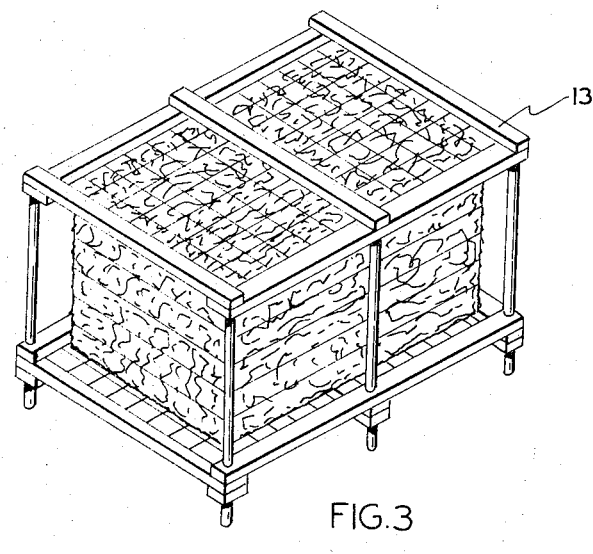
FIGURE 3 shows a cross section of a batt after spraying, and during drying, while said batt is restrained between frames spaced to regulate the density of the product.

The concentration of the spray solution or suspension mixture can vary from 1 to 35% by weight total solids, depending on the resin to latex ratio, the nature of the reagents, and the properties desired in the finished product. After being sprayed, the web or layer of fibers is either crosslapped conventionally as in FIGURE 1A, and then condensed through suitable rolls or other means to assure good contact between successive layers or webs, or collected on a reel, where condensing is done on a layer for layer basis, as shown in FIGURE 1B. The formed batts are then constricted by frames 13 (FIGURE 3) in such a manner as to maintain a specific height during drying and curing; or dried and cured without restraint, depending on the desired physical properties, such as density. Since a structure consisting of cellulosic fibers which have been formed into batts tends to expand in volume when subjected to heat or hot air circulation, this invention takes adavntage of this inherent characteristic in order to achieve a more open (less dense) finished product. The density of the product therefore can be varied by either varying the weight of the webs, the number of webs or layers of fibers used in the batt, or by varying the spacing between frames, as in FIGURE 3, or by adjusting the spacing between suitable open mesh dual belts for continuous drying.

The spray from a single solution has been accomplished by investigative formulation, which included the search for compatible systems which can contain the resin, the latex, the catalyst, the thickening agent, the dyes, and the solvents, which go into the spray application in a single solution or suspension or both.

Pretreatments of the raw stock feed, such as mercerization, scouring and wet processing with chemicals, such as formaldehyde, significantly enhance the properties of the finished product.

The many facets of tihs process, and their proper application by adjusting to the most suitable variables make it evident that there are many advantages to be gained in the practice of this invention. The following specific examples refer to materials actually produced on an experimental basis, and are in no way to be construed as specific limits to the flexibility of the system.

The batts produced by the use of this invention are dimensionally stable and resilient, and demonstrate a marked ability to reproduce contours of the confining mold used to restrain them during drying and curing.

Drying temperatures up to 325° F. can be used depending on whether drying will be carried out simultaneously with curing or as a separate unit operation to be followed by curing. In the latter instance drying temperatures up to 220° F. would be adequate for drying if followed by temperatures of up to 325° F. for curing. Suitable temperatures within this range can be selected depending upon the requirements of the chemicals employed. Evidence exists that the degree of expansion obtained in the finished product depends upon a relationship between the time of drying and the temperature employed. In general, longer times at lower temperatures will result in a more expanded structure in the finished product.

Upon the completion of the drying and curing step or steps, the product retains its preselected height, width, and length. Furthermore, the product is one having improved resilience, a resistance to deformation from compressive loading much greater than untreated cotton batting, and demonstrates a cohesive structure and resistance to compaction in use. In addition, the product made as a result of the practice of this invention has significantly greater tearing and tensile strength, up to twenty times as great as untreated cotton batting. The performance of the improved product can be demonstrated both at high and low relative humidities.

We have now discovered that it is possible to produce shaped or contoured cotton batting as well as other cellulosic batting products through the use of the instant process which is the subject of this invention, by placing the layered cotton fiber webs which have been spray dampened with a formulation containing both a thermosetting cellulose reactive crosslinking agent and a thermoplastic film-forming latex, the necessary catalyst, and a buffer and dye where desired and needed, into expanded metal molds while spray damp, then drying and curing at the select times and temperatures which are applicable to the chemicals and conditions chosen.

The most essential phase of the process of our invention is the step in the process where the cellulosic batting material must be placed wet, or spray dampened, into the expanded molds while batting is impregnated with the chemical solution to a wet add-on about from 50% to 150%. This is based on the original weight of the cotton or other cellulosic fibers used.

The configurations that we have specifically studied in detail are simple to complex concave and convex to planar. These can be formed from a single continuous piece of such spray damp cotton or other cellulosic batting in such a manner as to permit the fabrication of the cushions for bucket seats, upholstered furniture, or the like, by following the process of this invention.

The density of the finished batt can be made to vary from batt to batt as well as within a unit batt by proper adjustment of the spacing between the male and the female die or mold. Shape-conforming, resilient, dimensionally stable, coherent integral units having high tensile and/or tear strength can be produced easily, using the formulations which we cite in our examples, bearing in mind that these are not to be misconstrued as limiting in any manner whatever.

Our preferred 100% spray damp wet add-on when correlated with the 20% solids of the chemical bath can be used as a "point of departure" for computations, since the limits 50% and 150% are of no particular significance if the solids content is not taken into consideration. For example, if a 50% wet add-on is used with a 5% solids solution, the final dry pickup will be very low, while a 150% wet add-on used in correlation with a 25% solids solution (or emulsion) might be expensive as well as excessive to yield the desirable physical properties. There must be a certain degree of equivalence in these computations in order to obtain the desired results.

Since the resins found to contribute the enhanced properties described herein for cotton fibers are known to chemically react with the cellulose of the cotton fibers, such resins can be expected to react equally well with synthetic cellulosic fibers such as rayon. For this reason, the process described herein for the manufacture of a fibrous cotton batt is equally applicable to the fibrous cellulosics or blends of these materials with cotton.

Such resins as the urea formaldehydes, tris(1-aziridinyl) phosphine oxide, melamines, triazines, and others will react equally well with wool as with cotton. For this reason the process described herein for the manufacture of a fibrous cotton batt is equally applicable to wool or blends of wool and cotton.

Because textile wastes normally used in the production of cotton batting are derived from diverse sources, on occasion these wastes may contain varying nominal amounts of synthetic fibers, such as polyesters or acrylics polyethers or others either by chance or design. The presence of these synthetic fibers would not preclude the use of the waste in the practice of this invention.

In general, according to the invention, the method for producing a contoured and/or variably compacted fibrous cotton batt with improved stability, coherence, and resilience, comprises the following operations carried out in sequence:

(a) forming webs of opened textile fibers of the group consisting of cotton fibers, and chemically modified cotton fibers;

(b) spraying the webs to a wet add-on about from 50% to 150% with a resin-forming composition at least one component of which is a cellulose reactive crosslinking reagent to a resin add-on of about from 3.76% to 24.2% by weight of the cellulosic reactive component, based on the weight of the unsprayed web;

(c) placing the spray damp batt, wherein the degree of dampness amounts to at least 50% by weight, based on the weight of the unsprayed web, in a confining mold designed to impart to the finished batt a contoured configuration;

(d) drying the batt for about from 5 to 30 minutes of time at about from 180° to 220° F.; and (e) curing the dried batt for about from 2 to 30 minutes of time at about from 300° to 320° F.

Also, in general, according to the invention, the method for producing a fibrous cotton batt wherein selected portions of the batt exhibit varying degrees of resilience through varying degrees of compaction in addition to the improved stability, coherence, and resilience obtained through the process described above the compaction method comprises the same steps described above with the changes in (c) and (e) which must read as follows:

(c) placing the spray damp batt, wherein the degree of dampness amounts to at least 50% by weight based on the weight of the unsprayed web in a confining mold, the cavity of which is nonuniform with respect to thickness;

(e) curing the dried batt from about from 2 to 15 minutes of time at about from 300° to 320° F. to produce a batt with varying degree of fibrous compaction.

The above general procedure, wherein the webs are formed from mechanically opened cotton fibers and the resin forming composition comprises about 1 to 4 parts by weight of methylated methylol melamine and 1 part by weight of vinyl acrylic polymer, illustrates one embodiment of the invention.

The above general procedure, wherein the webs are formed from opened cotton fibers and the resin forming composition comprises approximately equal parts by weight of a urea-formaldehyde resin and vinyl acetate copolymer, illustrates a second embodiment.

The said general procedure, wherein the webs are formed from opened cotton fibers and the resin forming composition comprises about 1 part, by weight, of a urea-formaldehyde resin and about 1 part, by weight, of a copolymer mixture of vinyl acrylic copolymer and styrene-butadiene copolymer, the two copolymers being in the approximate ratio of 3 parts, by weight, of vinyl acrylic copolymer to 1 part, by weight, of styrene-butadiene copolymer, represents a third embodiment of the invention.

The said general procedure, wherein the webs are formed from opened cotton fibers that have been chemically modified by the form W formaldehyde treatment (as see U.S. Patent No. 3,046,079, and Chance et al., "Formaldehyde Treatment of Partially Swollen Cotton," Textile Res. J., volume 31, No. 4, April 1961), and the resin forming component comprises about 7 parts, by weight, of dimethylol ethyl carbamate and about 3 parts, by weight, of vinyl acetate copolymer, is an illustration of a fourth embodiment.

The said general procedure, wherein the webs are formed from opened cotton fibers that have been chemically modified by the aforesaid form W formaldehyde treatnent and the resin forming composition comprises approximately equal parts, by weight, of a urea-formaldehyde and vinyl acetate copolymer, represents a fifth embodiment.

The said general procedure, wherein the webs are formed from opened cotton fibers that have been mercerized and the resin forming composition comprises approximately equal parts, by weight, of a urea-formaldehyde and vinyl acetate copolymer, represents a sixth embodiment.

The said general procedure, wherein the webs are formed from opened cotton fibers that have been mercerized and the resin forming composition comprises approximately 7 parts, by weight, of dimethylol ethyl carbamate and about 3 parts, by weight, of vinyl acetate, represents a seventh embodiment.

The said general procedure, wherein the webs are formed from mechanically opened cotton fibers and the resin forming composition comprises methylated methylol melamine, represents an eighth embodiment.

These various embodiments are set forth in greater detail in the following examples:

EXAMPLE 1

Using a rawstock feed consisting of 60% first cut linters and 40% textile waste made up of 10% willowed picker, 10% willowed sweeps, and 20% willowed fly, a web was made using a sample card. The web was sprayed while on the apron of the card with a treating media consisting of 22.8% solids. The solids consisted of 76% by weight, of methylated methylol melamine and 24% vinyl acrylic copolymer. The wet add-on was approximately 100% by weight of the feed. The resulting product had therefore approximately 12% resin content (not including the latex), and a density of 2.86 pounds per cubic foot, which was equivalent in weight to a commercial cotton batting of 5.54 ounces per square foot. When this product was subjected to a cyclic compressive loading test to determine the *percent set*, taken after 50 loadings at 1 pound per square inch, it had an immediate set of 11%, under conditions of 60% relative humidity, and an immediate set of 19%, under conditions of 100% relative humidity. One hour later this sample had a set of 8% or less, under both 60 and 100% humidity conditions. In contrast, an untreated cotton batting of comparable weight subjected to the same test had an immediate set of 41.8% under the conditions of 60% R.H. (relative humidity) and 45.5% under 100% R.H. After one hour the untreated cotton had a set of 31% under the 60% R.H. conditions and 42% under the 100% R.H. Similar disparity in behavior was shown in energy absorption and stability to 15,000 cycles of loading.

EXAMPLE 2

Using the same type feed as above and forming a web in a similar manner spraying was then carried out using a spray media containing 17.7% solids. The solids consisted of 58% urea-formaldehyde and 42% vinyl acetate by weight. The resulting sprayed webs were then collected on a reel with condensing being carried out on a web for web basis until 30 webs had been collected. The partially formed batts were removed from the reel by slitting, and then placed in frames spaced ¾ in., 1 in., 1¼ in., and 1½ in. apart for drying and curing. The resulting products had densities of 3.22, 2.96, 2.91, and 2.58 pounds per cubic foot, respectively, and thicknesses of 1.14 in., 1.30 in., 1.38 in., and 1.45 in., respectively. After 50 cycles of compressional loading and unloading to 1 pound per square inch, these products had immediate sets of 17.3, 13.2, 17.1, and 18.9% when the test was run at 60% R.H., and after one hour of recovery had sets of 8.7, 4.6, 5.7, and 12.2%. When this test was run at 100% R.H., the samples had immediate sets of 20.0, 30.4, 28.5, and 32.5%, and after one hour recovery they had sets of 12.6, 22.7, 20.0, and 21.6% respectively.

EXAMPLE 3

Three companion batts were made from a comparable feed to that described in Example 1, using a spray media containing 10% solids, which was made up of 80% methylated methylol melamine and 20% vinyl acrylic copolymer. The batts contained 20, 30, and 40 webs. The still spray damp webs were condensed by compression rolling to a thickness of about ¾ of an inch. They were then placed in frames spaced 1½ in. apart, and dried and cured. The finished batts had densities of 1.48, 1.71, and 1.93 pounds per cubic foot, respectively. When tested by the cyclic loading and unloading compression test they had immediate set values of 29.0, 26.3, and 26.3% under conditions of 60% R.H., and 30 minutes later the respective values were 22.9, 18.8, and 21.5%. The values at 100% R.H. were 37.9, 41.0, and 37.2%, and these set values 30 minutes later were respectively 27.4, 34.7, and 33.7%. These values were significantly better than those achieved by comparable untreated cotton batts.

EXAMPLE 4

Using a comparable feed to that described for Example 1, and spraying the web from the card with a media containing 18.7% solids, which consisted of 53% urea-formaldehyde, 36% vinyl acrylic copolymer, and 11% styrene-butadiene copolymer batts consisting of 30 webs were built upon the reel device and condensed on a web for web basis. The partially formed batts were placed in frames spaced ¾ in. and 1 in. apart. Following the drying and curing, these batts had densities of 3.46 and 2.94 pounds per cubic foot, respectively. When subjected to the cyclic compressional loading and unloading compression test at 60% R.H., these samples had set values of 9.4 and 12.9% immediately upon completion of the test, and 10 minutes later they had set values of 2.7 and 8.1%, respectively. Under conditions of 100% R.H. the same samples showed sets of 15.2 and 21.0%, and after 30 minutes recovery these values changed to 8.3 and 16.2%, respectively. (Note: This is a significant improvement in performance at high relative humidity.) These samples were compressed to ½ their original height, and subjected to a temperature of 158° F. for 22 hours, and the set taken measured after ½ hour of recovery at ambient laboratory conditions of 60% R.H. and 70–73° F. temperature. The set in this case was 18.9%, and 21.0%, which changed to 8.1 and 9.8%, respectively, after 5½ hours.

EXAMPLE 5

The feed for this experiment consisted of 42% textile waste of various grades including picker, sweeps, and fly, and 58% first cut linters all of which had been scoured and mercerized. A portion of this material was formed into a web, and sprayed with a suspension of 15% solids, which consisted of 50% urea-formaldehyde and 50% vinyl acetate copolymer, and another portion sprayed with a combination solution suspension consisting of 20% solids made up of 70% dimethylol ethyl carbamate and 30% vinyl acetate copolymer. The product batts were obtained by lapping the web back and forth in a semi-conventional manner by hand until 30 webs had been built up in each case. The partially formed batts were condensed by rolling to a thickness of about 1 inch, and then placed in frames spaced 1½ in. for drying and curing. When tested by the cyclic loading and unloading compression test these samples showed sets of 30.3% and 16.7% immediately upon completion of the test at 60% R.H., and 30 minutes later had set values of 10.5 and 8.3%, respectively. When the same test was carried out at 100% R.H., the samples had values of 32.4 and 23.0% immediately, and 28.8 and 19.2% respective values one-half hour later.

EXAMPLE 6

Scoured but not mercerized raw stock similar to that described for Example 5 was treated with formaldehyde by the wet treatment known as "form W formaldehyde process," previously mentioned. In this case a chemical reaction takes place. The formaldehyde reacts with the cellulose molecule. After washing and drying this material it was formed into a web, and a portion of the web was sprayed with a suspension containing 15% solids, 50% of which was urea-formaldehyde, and the other 50% vinyl acetate copolymer. Another portion of the web was sprayed with a solution suspension consisting of 70% dimethylol ethyl carbamate and 30% vinyl acetate copolymer. Batts of 30 webs were made and condensed to about 1 inch, then dried and cured in frames 1½ inches apart. The products had densities of 1.69 and 1.81 pounds per cubic foot, respectively. The results of the cyclic compression loading test showed that these samples had set values of 19.4 and 21.6%, respectively, immediately after the completion of the test, and values of set of 9.7% and 14.9% one half-hour later, under conditions of 60% R.H. The set values at 100% R.H. were at 29.0 and 21.6% immediately, and 17.7 and 14.9% one-half hour later.

EXAMPLE 7

The feed material for this example consisted of 60% first cut linters and 40% textile wastes of various grades similar to those in Example 1. One batt was made by spraying the web with a suspension of a vinyl acrylic copolymer at a 20% solids content, and one batt was made by spraying the web with a solution containing methylated methylol melamine at 20% solids content. After spraying, forming, and condensing the batts were placed in frames spaced 1½ in. In the case of vinyl acrylic copolymer drying only sufficed to set the resin because it is of the thermoplastic type. In the case of the methylated methylol melamine curing following drying is required, because it is of the thermosetting type. A comparison of these batts on an equal number of webs basis demonstrates the different characteristics conferred by the two types of resins. At 20 webs the sample sprayed with the vinyl acrylic copolymer hereinafter called sample (a) had a density of 1.63 pounds per cubic foot, while the sample sprayed with the methylated methylol melamine hereinafter called sample (b) had a density of 1.02 pounds per cubic foot. When these samples were evaluated by the cyclic compression loading and unloading test at 60% R.H., sample (a) had a set of 33.4% immediately upon completion of the test, and 24.3% one hour later, while sample (b) had an immediate set value of 27.1%, and one hour later a set of 22.5%. Under conditions of 100% R.H., the cyclic compression loading test gave an immediate set value in sample (a) of 45.5%, and one hour later 36.4%, while sample (b) had a set value of 38.7% immediately, and 27.4% one hour later. When these materials were tested for heat tolerance under load, sample (a) had a set of 25.0% one-half hour after testing, and 14.7% 3½ hours later, while sample (b) had a set of 22.5% one-half hour after testing, and 16.0% 3½ hours later.

EXAMPLE 8

Using a feed material similar to Example 1, and spraying the webs with a solution suspension containing 22.8% solids made up of 76% methylated methylol melamine and 24% vinyl acrylic copolymer by weight, hand forming batts, and condensing to 1 inch, followed by drying and curing in frames spaced 1 inch during drying and 1½ inch during curing, a batt was produced which had a density of 1.71 pounds per cubic foot. This batt was subjected to 15,000 cycles of loading and unloading at the rate of 132 cycles per minute, and approximately 1 pound per square inch. The immediate set for this sample was 11.2%, and after recovering for 24 hours at 60% R.H. and 70° F. the sample had a set value of 3.3%. An untreated control cotton batting of comparable weight showed an immediate set of 40.6%, and after 24 hours the set was 29.7%. The experimental sample showed no tendency to compact under these conditions while compaction was evident in the untreated cotton batting.

EXAMPLE 9

Using a feed material similar to Example 1, and spraying the web as discharged from the card to a wet pickup of 130%, with a solution containing 10% solids, which was made up of 40% methylated methylol melamine and 60% vinyl acrylic copolymer by weight, a hand forming operation was performed to yield a 20 web batt. This batt was condensed to 1 inch, followed by drying and curing in frames spaced 1½ inches. The product had a resin add-on of 4.55%, and had a density of 1.42 pounds per cubic foot, which was equivalent to a commercial batting standard of 2.09 ounces per square foot. This product showed a compression set of 35.7% after 50 cyclic loadings at a load of 1 pound per square inch at 60% R.H., and 46.4% at 100% R.H. After 30 minutes of recovery the sample had a set value of 19.6% at 60% R.H., and 39.3% at 100% R.H. The product required a load of 5.38 pounds for a foot 50 square inches on a 100 square inch sample to reduce its thickness 25%. When held compressed to ½ its normal thickness at a temperature of 158° F. for 22 hours and then allowed to freely recover for 30 minutes at ambient room conditions the batt showed a set of 21.4%. This performance is better than that of untreated cotton batting as can be seen by referring to the data given in Example 1.

EXAMPLE 10

Using a feed material of the same makeup as shown for Example 1 the web was sprayed to a wet pickup of about 70% with a media containing 20% solids made up of 80% methylated methylol melamine and 20% vinyl acrylic copolymer a batt containing 40 webs was formed. This batt was condensed to a thickness of about 1 inch, then placed in frames spaced 1½ inches, dried, and cured. The resulting product had a resin add-on of 9.8%, and a density of 1.89 pounds per cubic foot, and was equivalent in weight to a standard untreated cotton batting of 3.97 ounces per square foot. This product required a load of 6.93 pounds load for a 50 square inch foot on a 100 square inch sample to compress it 25% of its original height. When tested for compression set at 60% and 100% relative humidity after 50 cyclic loadings at 1 pound per square inch, it had initial set values of 12.5% and 31.6%, respectively. Thirty minutes later these values were 10% and 25%, respectively. When held compressed to ½ its normal thickness at 158° F. for 22 hours, and then allowed to recover for 30 minutes at ambient room conditions, this sample had a set of 21.2%. By referring to Example 1, it can be seen that these samples performed better than untreated cotton batting.

EXAMPLE 11

Using a feed material similar to Example 1 and spraying the web as it is discharged from the garnett with a solution containing 10% solids of which 40% was methylated methylol melamine and 60% vinyl acrylic copolymer followed by hand layup, a batt consisting of 30 webs was produced. This batt was placed in frames spaced 1½ inches apart and dried at 200° F. for 90 minutes and then cured at 300° F. for 30 minutes. The resulting cured batt had a resin add-on (excluding latex) of 3.76%, a density of 1.98 pounds per cubic foot and was equivalent in weight to a commercial untreated batt of 3.63 ounces per square foot. This product when tested by the cyclic compression method had a set of 22.8% immediately upon completion of the test at 60% relative humidity, and a set of 46.2% under conditions of 100% relative humidity. Ten minutes later the values were 15.8% and 37.2% respectively. When subjected to a compression to ½ its original thickness at a temperature of 158° F. for 22 hours and allowed to recover for 30 minutes at ambient room temperature, this material had a set of 24.3%.

EXAMPLE 12

Using a feed material similar to that used for Example 1 and spraying the web as it is discharged from the garnett with a solution containing 20% solids, all of which was in the form of methylated methylol melamine, a product was produced which had a resin add-on of 24.2%. The product required a load of 5.72 pounds on a compression foot of 50 square inches to reduce the thickness of a 100 square inch sample to 75% of its original thickness. This product had a textile breaking strength of 24.5 lbs. in the direction of the fiber lay compared with a textile breaking strength of 5.20 pounds for untreated cotton batting sample of comparable weight. Similar differences were shown when the treated sample was tested for breaking strength in the direction transverse to the fiber lay and compared with the breaking strength of comparable weight untreated batting.

EXAMPLE 13

Using a feed material similar to that shown for Example 1 and spraying the web as it is discharged from the garnett with a solution containing 15% solids of which 60% was methylated methylol melamine and 40% was vinyl acrylic copolymer followed by hand layup, a batt was produced having 40 webs. This product had a resin add-on of 10.2% (excluding latex) after drying and curing in frames spaced 1½ inches apart. The density was 1.80 pounds per cubic foot, and on a weight basis was equivalent to untreated batting of 3.68 ounces per square foot. When tested for compression set under conditions of 60 and 100% relative humidity, this sample had set values of 24.4 and 41% immediately, and values of 20.5% and 37.2% after 4 minutes. This product required a load of 7.48 pounds on a 50 square inch foot to reduce the thickness of the sample by 25%. When compressed to ½ its original thickness and held at 158° F. for 22 hours, this sample demonstrated a set due to heat under load of 25.5% permitted to recover for ½ hour under room conditions without load. This sample showed a textile breaking strength in the direction of fiber lay of 44 pounds compared with 5.2 pounds for untreated cotton batting.

EXAMPLE 14

Using a raw stock feed consisting of 60% first cut linters and 40% textile waste, which was made up of 10% willowed picker, 10% willowed sweeps, and 20% willowed fly, a web was made with a sample card equipped with garnett type wire. The web was sprayed while on the apron of the card with a chemical formulation consisting of 18.3% solids. The solids consisted of 52.1% by weight of methylated methylol melamine and 47.9% by weight of vinyl acrylic copolymer. The sprayed web had a wet add-on of about 100% by weight of the cotton fed. This spray damp cotton batting was collected on a reel type device (item 11, FIGURE 1B), until a total of 30 webs had been built up. The spray damp material was then removed from the reel and placed in a pair of molds made of expanded metal to simulate the contours of the arm of an upholstered sofa (FIGURES 4A, B, C).

Note.—The use of expanded metal for mold parts is in no way critical to this invention.

The male and female pieces of the molds were then spaced so that the finished molded cotton batting product would have a density to approximately 2.5 pounds per cubic foot. The spray damp cotton in the confining mold was then placed in a cabinet type oven and submitted to the drying step which consisted of heating the material and mold for 2 hours at 200° F., followed by a 20 minute cure at 300° F.

The contoured fibrous cotton batt produced here was removed from the mold once it cooled to near room temperature, and upon close scrutiny and evaluation was found to have faithfully reproduced the contours of the mold, and exhibited a tensile strength in excess of 25 pounds in the direction of the fiber lay, and 15 pounds in the direction transverse to the fiber lay. The resiliency of the contoured fibrous cotton batt produced here was such that it returned to its original shape and position after a series of standard compressive loadings. Untreated cotton batting material which was submitted as control did not demonstrate sufficient integrity to hold a shape unless it was draped over the arm of a piece of furniture.

EXAMPLE 15

Using a feed of the type stated in Example 14 and a chemical formulation of the same general composition a spray damp batting having about an 85% wet add-on, based on the dry cotton fed to the sample card, was produced. This spray damp batting was placed in a mold which was specifically designed to simulate an automobile bucket seat (FIGURES 5A, B, C), the two halves of the confining mold being spaced so that a product having a density of 2.4 pounds per cubic foot, was produced, the impregnated spray damp material being dried at 200° F. for 2 hours, and cured at 300° F. for 40 minutes. The drying and curing of this experimental product were under investigation, and known to be excessive. Commercially, the drying time should be about from 2 to 30 minutes at the stated temperature, while the curing time should be about from 2 to 30 minutes at the stated temperatures, depending upon the thickness and density of the finished product.

The contoured fibrous cotton batt produced here was removed from the mold once it cooled to near room temperature, and upon close scrutiny and evaluation was found to have reproduced faithfully all of the concave and convex curvatures. This configuration was retained by the product after being submitted to severe handling, which consisted of twisting, pulling, and tearing attempts. The tensile strength of the product was in excess of 20 pounds in either the machine direction or the transverse direction. The resiliency of this batt with curved configuration was comparable to that of a pad with the flat configuration produced by the process of the aforesaid Patent No. 3,181,225. The recovery evaluations were determined from 50 deformation loading cycles at 1.0 pound per square inch, and 85% recovery was obtained within 4 minutes when the relative humidity was about 60-65%, and 75% recovery was obtained within the same period of time when the relative humidity was 100%.

The bonding and shape reproducing characteristics of the resins and latexes used in the product reinforce each other in reducing the powdering or dusting out of short fibers from the product when it is in use.

EXAMPLE 16

Using a feed of the type stated in Example 14 and a chemical formulation consisting of 20% solids to spray the cotton fibers while these were openly arrayed on the apron of the card, a product having a varying density at chosen locations was produced.

The spray solution was made up of 50% by weight of methylated methylol melamine, and 50% by weight of solids of vinyl acetate copolymer. This solution was sprayed onto the raw stock feed and a 115% spray damp wet add-on was obtained. This spray damp cotton batt which was made up of 20 webs of sprayed fibers was placed into the female portion of the expanded metal molds shown in FIGURES 4 and 5. The halves of the confining molds were then adjusted so that the density of the product would vary from point to point, with the densest portion in mold A (FIGURES 4A, B, and C) at the transition from flat to curved surface, and in mold B (FIGURES 5A, B, and C) with points of highest density occurring in the sharp short curved surface and at the base of the large scooped shaped section. The samples were dried in a cabinet oven for 2 hours at 200° F. and cured at 320° F. for 30 minutes.

The fibrous cotton batt wherein selected portions of the batt exhibit varying degrees of resilience through varying degrees of fibrous compaction was removed from the mold once it cooled to near room temperature, and upon close scrutiny and evaluation were found to demonstrate a density gradient throughout the product, the greatest density for mold A (FIGURES 4A, B, and C) being at the region where there is transition from flat to curved; and in the case of mold B (FIGURES 5A, B, and C) with the greatest densities occurring at the neck, or small curved section, and again at the base of the large scooped section. This is demonstrated more clearly in FIGURE 6 where greatest density occurred at the thinnest portions of the product.

These products show excellent resiliency. Efficient and rapid recovery from deformation loading was observed in the evaluation of the products produced by this process. The shape recovering characteristics were considered durable through rough handling, and the product had tensile strengths in excess of 20 pounds in the direction of the fiber lay, and 20 pounds in the transverse direction.

We claim:

1. A method of producing a contoured fibrous cellulosic batt having dimensional stability, coherence, and resiliency, comprising
   (a) forming a continuous web of opened textile fibers selected from the group consisting of cotton fibers, chemically modified cellulosic fibers, and blends thereof;
   (b) spraying the web to a wet add-on of about from 50% to 150% by weight, based on the weight of the unsprayed web, with a composition containing a thermosetting cellulose reactive crosslinking resin to a resin add-on of about from 3.76% to 24.2% by weight, based on the weight of the unsprayed web, of said thermosetting cellulose reactive crosslinking resin;
   (c) lapping the thus-sprayed web to obtain a multiplicity of layers and compressing said layers to produce a spray damp batt having a degree of dampness amounting to at least about 50% by weight, based on the weight of the unsprayed web;
   (d) placing the thus-produced spray damp batt within a confining mold designed to impart to the finished batt a configuration of a selected contour;
   (e) drying the batt in the mold for about from 5 to 30 minutes at about from 180° to 220° F.; and
   (f) curing the dried batt in the mold for about from 2 to 30 minutes at about from 300° to 320° F.

2. A method of producing a contoured fibrous cellulosic batt having dimensional stability and coherence, and having, in addition, selected portions which exhibit varying degrees of resiliency resulting from preselected varying degrees of compaction applied thereto, comprising
   (a) forming a continuous web of opened textile fibers selected from the group consisting of cotton fibers, chemically modified cellulosic fibers, and blends thereof;
   (b) spraying the web to a wet add-on of about from 50% to 150% by weight, based on the weight of the unsprayed web, with a composition containing a thermosetting cellulose reactive crosslinking resin to a resin add-on of about from 3.76% to 24.2% by weight, based on the weight of the unsprayed web, of said thermosetting cellulose reactive crosslinking resin;
   (c) lapping the thus-sprayed web to obtain a multiplicity of layers and compressing said layers to produce a spray damp batt having a degrees of dampness amounting to at least about 50% by weight, based on the weight of the unsprayed web;
   (d) placing the thus-produced batt within a confining mold designed to impart to the finished batt a configuration of a selected contour and the cavity of which is nonuniform with respect to thickness;
   (e) applying pressure to the batt while in the mold;
   (f) drying the batt in the mold for about from 5 to 30 minutes at about from 180° to 220° F.; and
   (g) curing the dried batt in the mold for about from 2 to 15 minutes at about from 300° to 320° F. to produce a batt with varying degrees of fibrous compaction.

3. A method of producing a contoured fibrous cellulosic batt having dimensional stability, coherence, and resiliency, comprising
   (a) forming a continuous web of opened textile fibers selected from the group consisting of cotton fibers, chemically modified cellulosic fibers, and blends thereof;
   (b) spraying the web to a wet add-on of about from 50% to 150% by weight, based on the weight of the unsprayed web, with a composition containing a thermosetting cellulose reactive crosslinking resin and a thermoplastic film-forming latex to a resin add-on of about from 3.76% to 24.2% by weight, based on the weight of the unsprayed web, of said thermosetting cellulose reactive crosslinking resin;
   (c) lapping the thus-sprayed web to obtain a multiplicity of layers and compressing said layers to produce a spray damp batt having a degree of dampness amounting to at least about 50% by weight, based on the weight of the unsprayed web;
   (d) placing the thus-produced spray damp batt within a confining mold designed to impart to the finished batt a configuration of a selected contour;
   (e) drying the batt in the mold for about from 5 to 30 minutes at about from 180° to 220° F.; and
   (f) curing the dried batt in the mold for about from 2 to 30 minutes at about from 300° to 320° F.

4. A method of producing a contoured fibrous cellulosic batt having dimensional stability and coherence, and having, in addition, selected portions which exhibit varying degrees of resiliency resulting from preselected varying degrees of compaction applied thereto, comprising
   (a) forming a continuous web of opened textile fibers selected from the group consisting of cotton fibers, chemically modified cellulosic fibers, and blends thereof;
   (b) spraying the web to a wet add-on of about from 50% to 150% by weight, based on the weight of the unsprayed web, with a composition containing a thermosetting cellulose reactive crosslinking resin and a thermoplastic film-forming latex to a resin add-on of about from 3.76% to 24.2% by weight, based on the weight of the unsprayed web, of said thermosetting cellulose reactive crosslinking resin;
   (c) lapping the thus-sprayed web to obtain a multiplicity of layers and compressing said layers to produce a spray damp batt having a degree of dampness amounting to at least about 50% by weight, based on the weight of the unsprayed web;
   (d) placing the thus-produced batt within a confining mold designed to impart to the finished batt a configuration of a selected contour and the cavity of which is nonuniform with respect to thickness;
   (e) applying pressure to the batt while in the mold;
   (f) drying the batt in the mold for about from 5 to 30 minutes at about from 180° to 220° F.; and
   (g) curing the dried batt in the mold for about from 2 to 15 minutes at about from 300° to 320° F. to produce a batt with varying degrees of fibrous compaction.

5. The process of claim 1 wherein the fibers are cotton fibers and the thermosetting resin is methylated methylol melamine.

6. The process of claim 3 wherein the thermosetting resin is selected from the group consisting of methylated methylol melamine, urea-formaldehyde, dimethylol ethyl carbamate, and tris(1-aziridinyl)phosphine oxide and the thermoplastic film-forming latex is selected from the group consisting of vinyl acrylic copolymer, vinyl acetate copolymer, styrene-butadiene copolymer, and a mixture of said vinyl acrylic copolymer and said styrenebutadiene copolymer.

7. The process of claim 3 wherein the fibers are cotton fibers, and the spray composition contains about from 1 to 4 parts by weight of methylated methylol melamine as the thermosetting resin and about 1 part by weight of vinyl acrylic copolymer as the thermoplastic latex.

8. The process of claim 3 wherein the fibers are cotton fibers, and the spray composition contains approximately equal parts by weight of urea-formaldehyde as the thermosetting resin and vinyl acetate copolymer as the thermoplastic latex.

9. The process of claim 3 wherein the fibers are cotton fibers, and the spray composition contains about 1 part by weight of urea-formaldehyde as the thermosetting resin and, as the thermoplastic latex, about 1 part by weight of a copolymer mixture of vinyl acrylic copolymer and styrene-butadiene copolymer, the two copolymers being in the approximate ratio of 3 parts by weight of the vinyl acrylic copolymer to 1 part by weight of the styrene-butadiene copolymer.

10. The process of claim 3 wherein the fibers are cotton fibers that have been chemically modified by the form W formaldehyde treatment, and the spray composition contains about 7 parts by weight of dimethylol ethyl carbamate as the thermosetting resin and about 3 parts by weight of vinyl acetate copolymer as the thermoplastic latex.

11. The process of claim 3 wherein the fibers are cotton fibers that have been mercerized, and the spray composition contains approximately equal parts by weight of urea-formaldehyde as the thermosetting resin and vinyl acetate copolymer as the thermoplastic latex.

References Cited

UNITED STATES PATENTS 2,462,940   3/1949   Bowes ------------- 264—324

ROBERT F. WHITE, *Primary Examiner.*

J. R. HALL, *Assistant Examiner.*